United States Patent
Lee et al.

(10) Patent No.: US 6,838,190 B2
(45) Date of Patent: Jan. 4, 2005

(54) ARTICLE WITH INTERMEDIATE LAYER AND PROTECTIVE LAYER, AND ITS FABRICATION

(75) Inventors: Ching-Pang Lee, Cincinnati, OH (US); Melvin Robert Jackson, Niskayuna, NY (US); Stephen Joseph Ferrigno, Cincinnati, OH (US); Gary Edward Trewiler, Loveland, OH (US); Mark Daniel Gorman, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/028,109

(22) Filed: Dec. 20, 2001

(65) Prior Publication Data

US 2003/0118448 A1 Jun. 26, 2003

(51) Int. Cl.[7] .................. B32B 15/04; B32B 15/20; F01D 5/14; B64C 11/16
(52) U.S. Cl. ............ 428/670; 428/666; 428/669; 428/652; 416/241 R
(58) Field of Search .................. 428/670, 666, 428/680, 668, 667, 686, 650, 652, 220; 416/241 R

(56) References Cited

U.S. PATENT DOCUMENTS

| | | | |
|---|---|---|---|
| 4,025,314 A | 5/1977 | Sadowski et al. | 428/680 |
| 4,123,594 A * | 10/1978 | Chang | 428/651 |
| 4,169,744 A | 10/1979 | D'Silva | 148/32 |
| 4,414,178 A | 11/1983 | Smith, Jr. et al. | 422/444 |
| 4,477,538 A * | 10/1984 | Clarke | 428/656 |
| 4,746,379 A | 5/1988 | Rabinkin | 148/403 |
| 5,427,866 A * | 6/1995 | Nagaraj et al. | 428/610 |
| 5,523,169 A | 6/1996 | Rafferty et al. | 428/551 |
| 5,688,607 A * | 11/1997 | Rose et al. | 428/639 |
| 5,916,518 A | 6/1999 | Chesnes | 420/438 |
| 5,942,337 A * | 8/1999 | Rickerby et al. | 428/623 |
| 6,001,492 A * | 12/1999 | Jackson et al. | 428/610 |
| 6,071,470 A | 6/2000 | Koizumi et al. | 420/461 |
| 6,089,444 A | 7/2000 | Slattery et al. | 228/194 |
| 6,165,290 A | 12/2000 | Rabinkin | 148/403 |
| 6,183,888 B1 * | 2/2001 | Alperine et al. | 428/670 |
| 6,602,548 B2 * | 8/2003 | Narasimhan et al. | 427/250 |

OTHER PUBLICATIONS

Y. Yamabe–Mitarai et al., "Rh–Base Refractory Superalloys for Ultra–High Temperature Use," *Scripta Materialia*, vol. 36, No. 4, pp. 393–398 (1997), no month.

Y. Yamabe–Mitarai et al., "Ir–Base Refractory Superalloys for Ultra–High Temperatures," *Metallurgical and Materials Transactions A*, vol. 29A, pp. 537–549 (Feb. 1998).

* cited by examiner

*Primary Examiner*—Michael LaVilla
(74) *Attorney, Agent, or Firm*—McNees Wallace & Nurick LLP

(57) ABSTRACT

A protected article includes a nickel-base superalloy substrate, an interlayer overlying the substrate, and a protective layer overlying the interlayer. The protective layer has a composition comprising at least one of rhodium, platinum, palladium, and ruthenium. In one composition, palladium is present in an amount of from about 1 to about 41 atomic percent; platinum is present in an amount of about (40+atomic percent palladium) atomic percent for palladium ranging from about 1 atomic percent to about 14 atomic percent and up to about 54 atomic percent for palladium ranging from about 15 atomic percent up to about 41 atomic percent; rhodium is present in an amount of at least about 24 atomic percent; zirconium, hafnium, titanium, and mixtures thereof are present in an amount of from zero up to about 5 atomic percent; and ruthenium is present in an amount of from zero up to about 5 atomic percent, balance impurities. The interlayer has a coefficient of thermal expansion intermediate between that of the substrate and that of the protective layer. The protected article is fabricated by furnishing the substrate, applying the interlayer over the substrate, and applying the protective layer over the interlayer. The application of the protective layer may be, for example, by welding or attachment of a solid piece.

16 Claims, 3 Drawing Sheets

ARTICLE WITH INTERMEDIATE LAYER AND PROTECTIVE LAYER, AND ITS FABRICATION

This invention relates to articles protected by a protective layer and, more particularly, to nickel-base superalloy articles such as gas turbine components protected by a metallic protective layer.

BACKGROUND OF THE INVENTION

In an aircraft gas turbine (jet) engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against an airfoil section of the turbine blades and vanes, which turns the shaft and provides power to the compressor and fan. In a more complex version of the gas turbine engine, the compressor and a high pressure turbine are mounted on one shaft, and the fan and low pressure turbine are mounted on a separate shaft. In any event, the hot exhaust gases flow from the back of the engine, driving it and the aircraft forwardly.

The hotter the combustion gases, the more efficient is the operation of the jet engine. There is thus an incentive to raise the combustion gas temperature. The maximum temperature of the combustion gas is normally limited by the materials used to fabricate the turbine vanes and turbine blades of the turbine, upon which the hot combustion gases impinge. In current engines, the turbine vanes and blades are made of nickel-based superalloys, and can operate at temperatures of up to about 1900–2150° F.

A number of techniques have been employed to increase the operating temperatures beyond the ordinary capability of the nickel-base superalloys that are the preferred materials of construction. In one approach, a protective structure is applied to the surface of the article. Environmental coatings of aluminum-rich alloys are widely used. The upper surface of the environmental coating oxidizes to a protective aluminum oxide scale. Ceramic thermal barrier coatings may also be applied directly to the substrate or, more preferably, overlying the aluminum-rich coating layer. While operable, environmental coatings have maximum-temperature limitations. Ceramic thermal barrier coatings are subject to failure by impact and thermal cycling damage.

Accordingly, there is a need for an improved approach to the protection of articles and their surfaces in the extreme conditions of operation of the components of gas turbine engines. The present invention fulfills this need, and further provides related advantages.

BRIEF SUMMARY OF THE INVENTION

The present invention provides a protected article and a method for its fabrication. The article is protected by a metallic protective layer that has excellent resistance to oxidation at temperatures above those of conventional metallic protective layers. A structure is provided to reduce the tendency of the protective layer to fail by mechanisms associated with thermal cycling damage as the protected article is heated and cooled over large temperature ranges.

A protected article comprises a substrate, an interlayer overlying the substrate, and a protective layer overlying the interlayer and having a composition different from that of the interlayer. The substrate is preferably a nickel-base alloy, and most preferably a nickel-base superalloy. The protective layer is an alloy comprising at least one of rhodium, platinum, palladium, and ruthenium, desirably in an amount of at least about 10 atomic percent of the protective layer. The protective layer preferably has a composition comprising, in atomic percent, palladium in an amount of from about 1 to about 41 percent; platinum in an amount of about (40+atomic percent palladium) percent for palladium ranging from about 1 percent to about 14 percent and up to about 54 percent platinum for palladium contents ranging from about 15 percent up to about 41 percent; rhodium in an amount of at least about 24 percent; zirconium, hafnium, titanium, and mixtures thereof in an amount from zero up to about 5 percent; ruthenium in an amount from zero up to about 5 percent; balance other elements and impurities.

The interlayer desirably has a coefficient of thermal expansion intermediate between that of the substrate and that of the protective layer. The interlayer preferably comprises from about 15 to about 35 percent, preferably about 25 percent, by volume of alpha chromium phase measured at 2000° F., and the balance a nickel-containing phase. An acceptable interlayer composition comprises from about 51 to about 61 atomic parts chromium, from about 18 to about 26 atomic parts palladium, and from about 18 to about 26 atomic parts nickel (but the nickel and palladium need not be present in equal amounts), optionally with the addition of from about 5 to about 8 atomic parts aluminum. A most preferred interlayer composition is about 56 atomic parts chromium, about 22 atomic parts nickel, and about 22 atomic parts palladium.

The protective layer may be furnished in any operable form, such as a weldment or an attached piece.

A method for protecting an article comprises the steps of furnishing a substrate, applying an interlayer overlying the substrate, and applying a protective layer overlying the interlayer. The substrate, the interlayer, and the protective layer are as described above. Any of the structural features discussed above may be used with the method. The step of applying the interlayer may be accomplished by any operable method, such as welding or applying the interlayer as a solid piece. The step of applying the protective layer may be accomplished by any operable method, such as welding or applying the interlayer as a solid piece for bonding or edge-weld attachment.

In its most preferred form, the protective layer is a rhodium-based alloy that has excellent oxidation resistance at temperatures as high as 2600° F. However, this protective layer has a much lower coefficient of thermal expansion than that of conventional substrates such as nickel-base superalloys. If the protective layer were applied directly to the substrate, there would be a high likelihood of premature failure of the protected structure as a result of the accumulation of thermal strains and stresses during thermal cycling of the protected article between room temperature and temperatures as high as 2200° F. The interlayer preferably has a coefficient of thermal expansion intermediate between that of the substrate and that of the protective layer to absorb some of the thermal strain and thereby extend the life of the protective structure to greater numbers of thermal cycles in service.

The expansion of chromium is close to that of the protective layer. An alloy with a relatively high chromium content is therefore preferred for the interlayer. The preferred chromium-rich composition produces a structure having a substantial volume fraction, preferably at least about 15 percent by volume, of alpha-chromium phase in a nickel-rich matrix. The palladium provides a low-melting-point eutectic in the nickel-palladium-chromium system.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
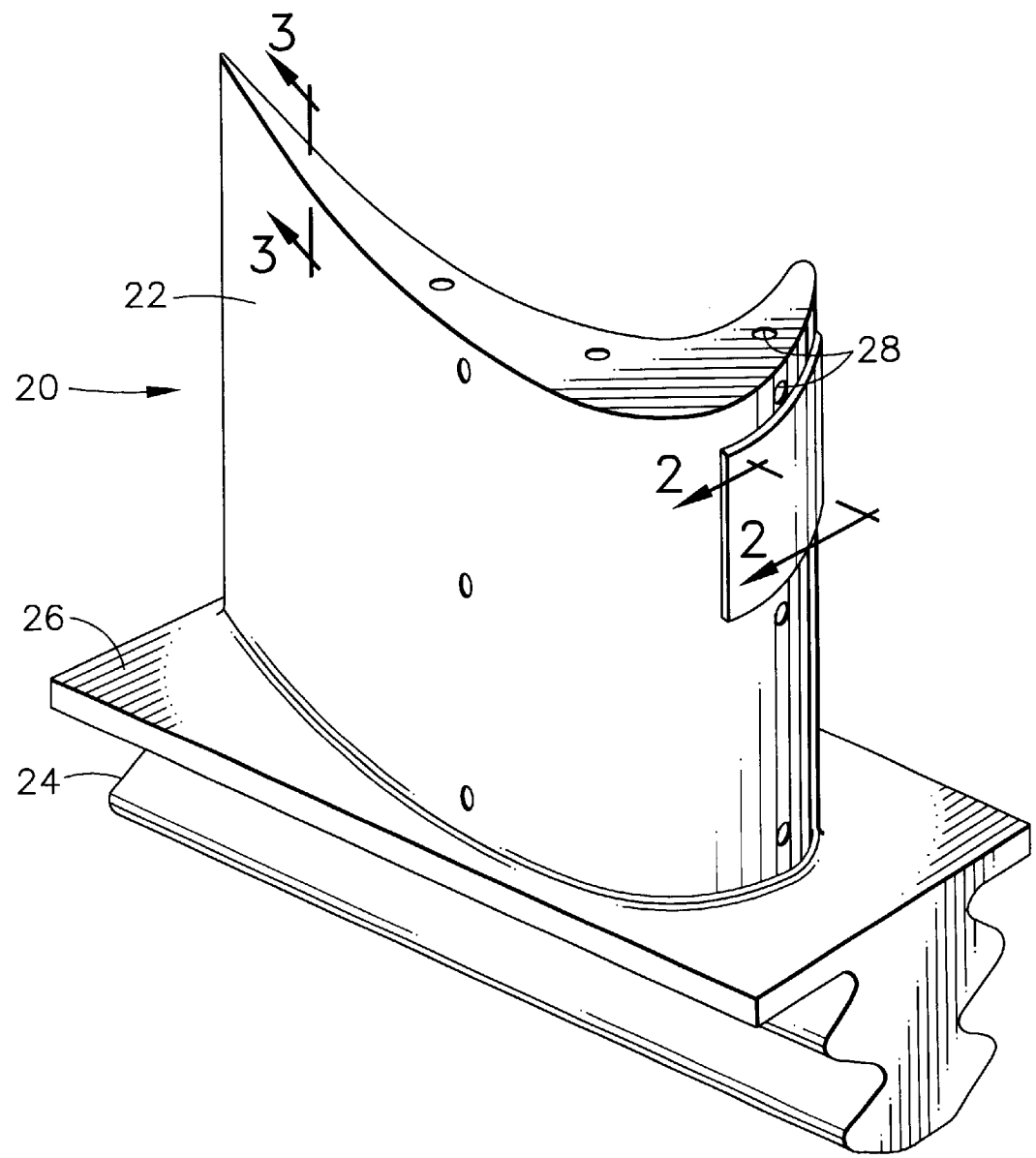
FIG. 1 is a perspective view of a turbine blade.

FIG. 1 depicts a component article of a gas turbine engine such as a turbine blade or turbine vane, and in this illustration a turbine blade 20. The turbine blade 20 is formed of any operable material, but is preferably a nickel-base superalloy. The turbine blade 20 includes an airfoil section 22 against which the flow of hot exhaust gas is directed. (The turbine vane has a similar appearance in respect to the pertinent airfoil section, but typically includes other end structure to support the airfoil.) The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 is joined to the dovetail 24. A number of internal passages extend through the interior of the airfoil 22, ending in openings 28 in the surface of the airfoil 22. During service, a flow of cooling air is directed through the internal passages to reduce the temperature of the airfoil 22.

Figure 2:
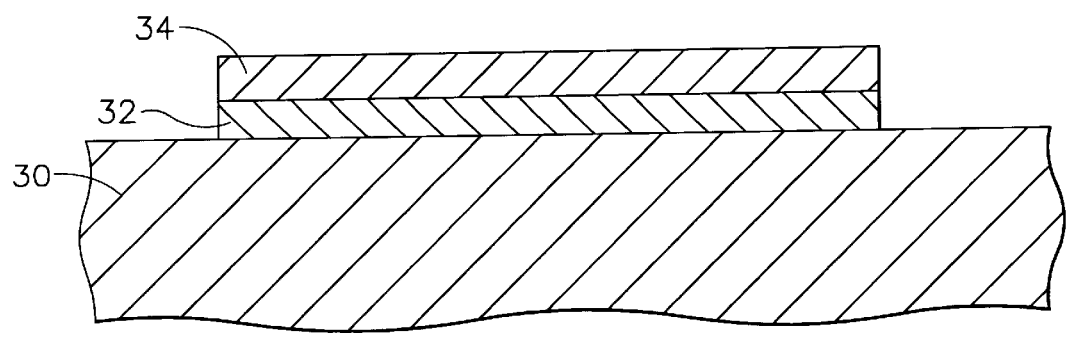
FIG. 2 is an enlarged schematic sectional view through the turbine blade of FIG. 1, taken on line 2—2.
Figure 3:
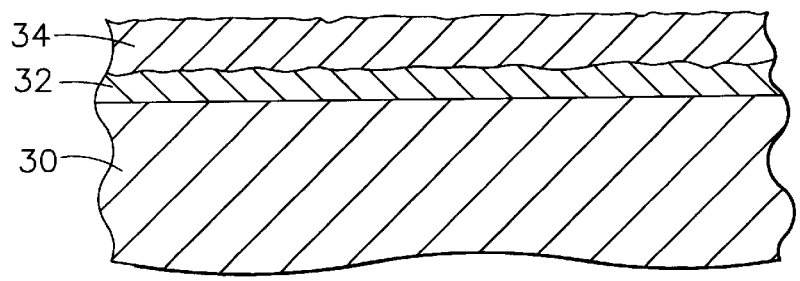
FIG. 3 is an enlarged schematic sectional view through the turbine blade of FIG. 1, taken on line 3—3.
Figure 6:
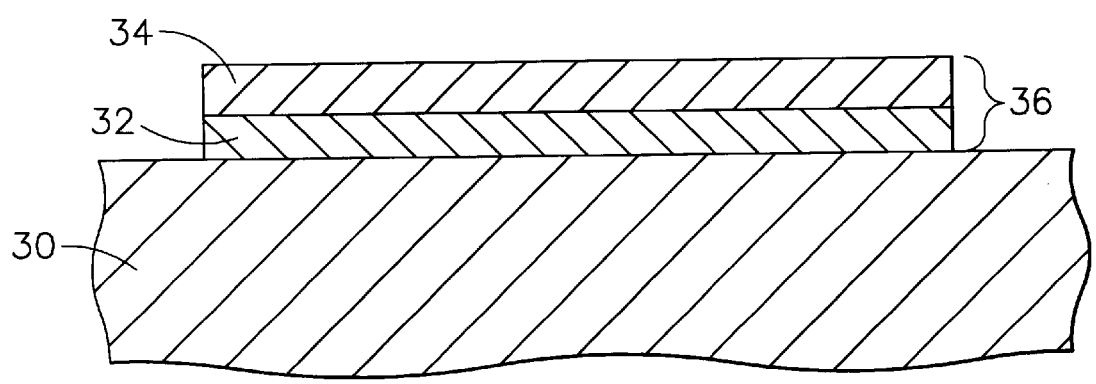
FIG. 6 is a enlarged schematic sectional view like those of FIGS. 2 and 3, of another embodiment.

FIGS. 2, 3, and 6 are sections through the airfoil 22, showing three examples of approaches to the protective coating. In each case, there is the turbine blade 20 that provides a substrate 30, an interlayer 32 overlying the substrate 30, and a protective layer 34 overlying the interlayer 32. The top region of the substrate 30, the interlayer 32, and the protective layer 34 are typically somewhat interdiffused either by the fabrication procedure or during service.

In the embodiment of FIG. 2, the interlayer 32 is provided as a solid attached piece of the interlayer material that is joined to the substrate 30, and the protective layer 34 is provided as a solid attached piece of the protective-layer material that is joined to the interlayer 32, after the interlayer 32 has already been joined to the substrate 30. This embodiment is used to apply a thin sheet of the protective layer 34 to a selected location of the turbine blade 20, such as a leading edge, a trailing edge, a specific location of the pressure side, or the like. It is also used to apply a thin sheet to other articles.

In the embodiment of FIG. 3, the interlayer 32 is provided as a weld filler material of the interlayer material and is melted onto the surface of the substrate during application. The protective layer 34 is provided as a weld filler material of the protective layer material and is melted onto the surface of the interlayer 32 during application. This embodiment is used to apply a weldment such as a weld repair to the tip of the turbine blade 20 as illustrated in FIG. 1, or as a weldment to another area of the turbine blade or another article.

The embodiment of FIG. 6 is similar to that of FIG. 2, but in the embodiment of FIG. 6 the interlayer 32 and the protective layer 34 are prepared and provided as freestanding pieces, typically thin sheets of the appropriate compositions, and joined together before joining to the substrate 30. The freestanding pieces 32 and 34 are first joined together as a freestanding assembly 36, and then the freestanding assembly 36 is joined to the turbine blade 20. The two joining operations may be accomplished by any operable approach, such as welding or brazing. The approaches of FIGS. 2, 3, and 6 may be intermixed to the extent operable and compatible. For example, the interlayer 32 may be supplied as a solid attached piece and the protective layer 34 melted onto it, or the interlayer 32 may be melted onto the substrate 30 and the protective layer 34 applied as a solid piece overlying the interlayer 32.

Figure 4:
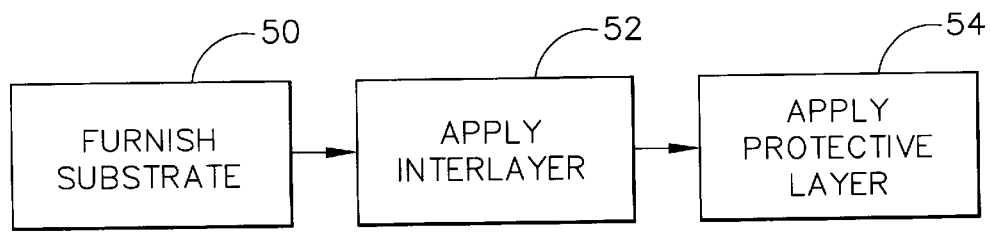
FIG. 4 is a block flow diagram of an approach for preparing an externally coated gas turbine airfoil.

FIG. 4 is a block flow diagram of a preferred approach for fabricating an article. An article and thence the substrate 30 are provided, numeral 50. The article is preferably a component of a gas turbine engine such as a gas turbine blade 20 or vane (or "nozzle", as the vane is sometimes termed), see FIG. 1. The article may be a single crystal article, a preferentially oriented polycrystal, or a randomly oriented polycrystal. The article is most preferably made of a nickel-base superalloy. As used herein, "nickel-base" means that the composition has more nickel present than any other element. The "nickel-base superalloys" are typically of a composition that is strengthened by the precipitation of gamma-prime phase or a related phase. The preferred nickel-base alloy has a composition, in weight percent, of from about 4 to about 20 percent cobalt, from about 1 to about 14 percent chromium, from about 3 to about 8 percent aluminum, from 0 to about 2 percent molybdenum, from about 3 to about 8 percent tungsten, from about 4 to about 12 percent tantalum, from 0 to about 2 percent titanium, from 0 to about 8 percent rhenium, from 0 to about 6 percent ruthenium, from 0 to about 1 percent niobium, from 0 to about 0.1 percent carbon, from 0 to about 0.01 percent boron, from 0 to about 0.1 percent yttrium, from 0 to about 1.5 percent hafnium, balance nickel and incidental impurities.

A most preferred alloy composition is Rene' N5, which has a nominal composition in weight percent of about 7.5 percent cobalt, about 7 percent chromium, about 6.2 percent aluminum, about 6.5 percent tantalum, about 5 percent tungsten, about 1.5 percent molybdenum, about 3 percent rhenium, about 0.05 percent carbon, about 0.004 percent boron, about 0.15 percent hafnium, up to about 0.01 percent yttrium, balance nickel and incidental impurities. Other operable superalloys include, for example, Rene' N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities; Rene 142, which has a nominal composition, in weight percent, of about 12 percent cobalt, about 6.8 percent chromium, about 1.5 percent molybdenum, about 4.9 percent tungsten, about 6.4 percent tantalum, about 6.2 percent aluminum, about 2.8 percent rhenium, about 1.5 percent hafnium, about 0.1 percent carbon, about 0.015 percent boron, balance nickel and incidental impurities; CMSX-4, which has a nominal composition in weight percent of about 9.60 percent cobalt, about 6.6 percent chromium, about 0.60 percent molybdenum, about 6.4 percent tungsten, about 3.0 percent rhenium, about 6.5 percent tantalum, about 5.6 percent aluminum, about 1.0 percent titanium, about 0.10 percent hafnium, balance nickel and incidental impurities; CMSX-10, which has a nominal composition in weight percent of about 7.00 percent cobalt, about 2.65 percent chromium, about 0.60 percent molybdenum, about 6.40 percent tungsten, about 5.50 percent rhenium, about 7.5 percent tantalum, about 5.80 percent aluminum, about 0.80 percent titanium, about 0.06 percent hafnium, about 0.4 percent niobium, balance nickel and incidental impurities; PWA1480, which has a nominal composition in weight percent of about 5.00 percent cobalt, about 10.0 percent chromium, about 4.00 percent tungsten, about 12.0 percent tantalum, about 5.00 percent aluminum, about 1.5 percent titanium, balance nickel and incidental impurities; PWA1484, which has a nominal composition in weight percent of about 10.00 percent cobalt, about 5.00 percent chromium, about 2.00 percent molybdenum, about 6.00 percent tungsten, about 3.00 percent rhenium, about 8.70 percent tantalum, about 5.60 percent aluminum, about 0.10 percent hafnium, balance nickel and incidental impurities; and MX-4, which has a nominal composition, in weight percent, of from about 0.4 to about 6.5 percent ruthenium, from about 4.5 to about 5.75 percent rhenium, from about 5.8 to about 10.7 percent tantalum, from about 4.25 to about 17.0 percent cobalt, from 0 to about 0.05 percent hafnium, from 0 to about 0.06 percent carbon, from 0 to about 0.01 percent boron, from 0 to about 0.02 percent yttrium, from about 0.9 to about 2.0 percent molybdenum, from about 1.25 to about 6.0 percent chromium, from 0 to about 1.0 percent niobium, from 0 to about 5.0 to about 6.6 percent aluminum, from 0 to about 1.0 percent titanium, from about 3.0 to about 7.5 percent tungsten, and wherein the sum of molybdenum plus chromium plus niobium is from about 2.15 to about 9.0 percent, and wherein the sum of aluminum plus titanium plus tungsten is from about 8.0 to about 15.1 percent, balance nickel and incidental impurities. The use of the present invention is not limited to these preferred alloys, and has broader applicability.

Figure 5:
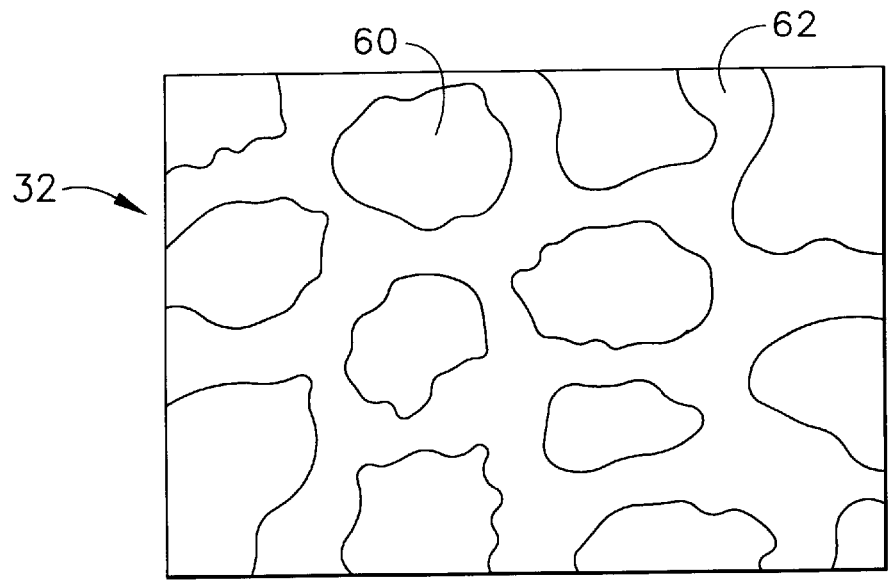
FIG. 5 is an idealized microstructure of the interlayer.

The interlayer 32 is applied, numeral 52. The material of the interlayer 32 is preferably selected to have a coefficient of thermal expansion intermediate between that of the substrate 30 and that of the protective layer 34. The average coefficient of thermal expansion of typical superalloys used in the substrate 30 over the temperature range from room temperature to 2000° F. is typically about 6–10 microinch/microinch/° F. The average coefficient of thermal expansion of the preferred alloy used in the protective layer 34, to be described subsequently, over the temperature range from room temperature to 2000° F. is typically about 6.5–7.2 microinch/microinch/° F. Alpha-phase chromium alloys have a coefficient of thermal expansion from room temperature to 2000° F. that is close to that of the alloy used in the protective layer 34, and typically is about 5.7 inch/inch/° F. A mixture of the alpha chromium phase and a nickel-rich phase may be tailored to have a desired intermediate coefficient of thermal expansion. It is therefore preferred that the material of the interlayer have at least about 15 percent by volume of alpha chromium phase, more preferably from about 15 to about 35 percent by volume of the alpha chromium phase, and most preferably about 25 percent by volume of alpha chromium phase. The remainder of the structure is, in each case, a nickel-rich phase. FIG. 5 depicts a preferred microstructure of the interlayer 32, with the alpha-chromium phase 60 and the nickel-rich phase 62.

The interlayer 32 most preferably has a composition comprising from about 51 to about 61 atomic parts chromium, from about 18 to about 26 atomic parts palladium, and from about 18 to about 26 atomic parts nickel (but the nickel and palladium need not be present in equal amounts), and optionally has an addition of from about 5 to about 8 atomic parts aluminum. Minor amounts of other elements such as impurities may be present as well. The total of all of the elements is 100 atomic percent. If the chromium is present in an amount of less than about 51 atomic parts, the volume fraction of alpha chromium phase is too low (i.e., below about 15 volume percent) and the coefficient of thermal expansion of the interlayer 32 is too high. If the chromium is present in an amount of more than about 61 atomic parts, the volume fraction of alpha chromium phase is greater than about 35 percent and the ductility of the interlayer 32 is too low, with the result that processing and joining become unacceptably difficult.

Palladium is preferably added to the chromium-nickel alloy to provide a low-melting point matrix in the nickel-palladium-chromium eutectic (or near-eutectic) structure. The minimum melting composition in the nickel-palladium binary system is near the equiatomic composition at about 1237° C. The molten nickel-palladium-chromium ternary system of the above indicated composition range has an approximately equiatomic nickel-palladium phase with the chromium in solution. This molten interlayer interdiffuses with the material of the substrate 30 and with the material of the protective layer 34, and the melting point of the inter-diffused region increases as the chromium and palladium are diluted with elements diffused in from the substrate 30 and the protective layer 34. If the palladium is less than about 18 atomic parts, the liquidus temperature of the alloy becomes so high that joining and processing operations become too difficult with conventional available apparatus. If the palladium is more than about 26 atomic parts, there is observed an overly large reaction zone of the interlayer 32 with the substrate 30 during processing, so that the substrate 30 is unacceptable weakened.

Nickel forms the balance of the interlayer 32. The interlayer may further comprise from about 5 to about 8 atomic parts aluminum. Most preferably, the interlayer 32 comprises about 56 atomic parts chromium, about 22 atomic parts nickel, and about 22 atomic parts palladium.

The interlayer 32 may be applied as a solid piece and bonded to the surface of the substrate 30, as in FIG. 2. The interlayer 32 may instead be supplied as a weld filler material and melted onto the surface of the substrate 30, as in FIG. 3. Welding may be accomplished by any operable approach. In either case, during application and/or service an interdiffusion of the adjacent portions of the substrate 30 and the interlayer 32 may occur. This interdiffusion is desired, as it tends to raise the melting point of the interlayer 32 and improve the oxidation resistance of the interdiffused combination. The interlayer 32 may instead be joined to the protective layer 34 prior to joining this assembly 36 to the substrate 30, as in FIG. 6.

The protective layer 34 is applied overlying the interlayer 32, numeral 54. The protective layer 34 preferably has a composition comprising rhodium, platinum, and palladium, and optionally ruthenium. The composition preferably comprises, in atomic percent, palladium in an amount of from about 1 to about 41 percent, platinum in an amount of about (40+atomic percent palladium) percent for palladium ranging from about 1 percent to about 14 percent and up to about 54 percent for palladium ranging from about 15 percent up to about 41 percent, rhodium in an amount of at least about 24 percent, zirconium, hafnium, titanium, and mixtures thereof in an amount from zero up to about 5 percent, ruthenium in an amount from zero up to about 5 percent, balance impurities. This alloy has excellent oxidation resistance, but is expensive and is therefore used as a protective layer rather than to fabricate the entire article. The interlayer 32 is necessary because this alloy has a considerably lower coefficient of thermal expansion than the substrate 30. Absent the interlayer 32, the resulting thermal stresses and strains produced during thermal cycling of the protected article could lead to delamination of the protective layer from the substrate. The interlayer 32 helps to absorb the stresses and strains produced during thermal cycling, thereby aiding in maintaining the adhesion of the protective layer to the underlying structure.

The protective layer 34 is preferably applied by welding or brazing. In one approach, FIG. 2, it is applied as a solid piece. The underlying interlayer 32, which has a lower melting point than either the substrate 30 or the protective layer 34, is melted during the application process and then resolidified to cause bonding of the interlayer 32 to the substrate 30 and to the protective layer 34. In another approach, FIG. 3, the protective layer 34 is melted and deposited upon the interlayer 32, by welding. Any operable welding technique may be used. As an example, the protective layer 34 may be applied by welding using a wire of the protective layer material or by laser welding using a powder of the material of the protective layer 34. In another approach, FIG. 6, the protective layer 34 and the interlayer 32 are provided as freestanding pieces and thereafter joined together by any operable approach, typically by welding or brazing, to form the assembly 36. The assembly 36 is thereafter joined to the substrate 30 by any operable approach, typically by welding or brazing.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A protected article comprising:
    a substrate;
    an interlayer overlying the substrate; and
    a protective layer overlying the interlayer, wherein the protective layer comprises rhodium, platinum, and palladium, balance other elements and impurities.

2. The protected article of claim 1, wherein the substrate comprises a nickel-base superalloy.

3. The protected article of claim 1, wherein the interlayer comprises from about 15 to about 35 percent by volume of alpha chromium phase.

4. The protected article of claim 1, wherein the interlayer has a coefficient of thermal expansion intermediate between that of the substrate and that of the protective layer.

5. The protected article of claim 1, wherein the interlayer is a weldment.

6. The protected article of claim 1, wherein the interlayer is an attached piece.

7. The protected article of claim 1, wherein
    the palladium in the protective layer is present in an amount of from about 1 to about 41 atomic percent,
    the platinum in the protective layer is present in an amount of about (40+atomic percent palladium) atomic percent for palladium ranging from about 1 atomic percent to about 14 atomic percent and up to about 54 atomic percent for palladium ranging from about 15 atomic percent up to about 41 atomic percent, and
    the rhodium in the protective layer is present in an amount of at least about 24 atomic percent.

8. The protected article of claim 7, wherein
    zirconium, hafnium, titanium, and mixtures thereof are present in the protective layer in an amount of from zero up to about 5 atomic percent, and
    ruthenium is present in the protective layer in an amount from zero up to about 5 atomic percent.

9. A protected article comprising:
    a substrate;
    an interlayer overlying the substrate, wherein the interlayer comprises about 56 atomic parts chromium, about 22 atomic parts nickel, and about 22 atomic parts palladium; and
    a protective layer overlying the interlayer, the protective layer having a composition comprising at least one element selected from the group consisting of rhodium, platinum, palladium, and ruthenium, balance other elements and impurities.

10. A protected article comprising:
    a substrate;
    an interlayer overlying the substrate, wherein the interlayer comprises from about 51 to about 61 atomic parts chromium, from about 18 to about 26 atomic parts palladium, and from about 18 to about 26 atomic parts nickel; and
    a protective layer overlying the interlayer, the protective layer having a comprising at least one element selected from the group consisting of rhodium, platinum, palladium, and ruthenium, balance other elements and impurities.

11. The protected article of claim 10, wherein the interlayer further comprises from about 5 to about 8 atomic parts aluminum.

12. The protected article of claim 10, wherein the protective layer is a weldment.

13. The protected article of claim 10, wherein the protective layer is an attached piece.

14. A protected article comprising:
    a nickel-base superalloy substrate;
    an interlayer overlying the substrate, wherein the interlayer comprises from about 15 to about 35 percent by volume of alpha chromium phase; and
    a protective layer overlying the interlayer, the protective layer having a composition comprising rhodium, platinum, and palladium, wherein the palladium is present in an amount of from about 1 to about 41 atomic percent, the platinum is present in an amount of about (40+atomic percent palladium) atomic percent for palladium ranging from about 1 atomic percent to about 14 atomic percent and up to about 54 atomic percent for palladium ranging from about 15 atomic percent up to about 41 atomic percent, rhodium in an amount of at least about 24 atomic percent, zirconium, hafnium, titanium, and mixtures thereof in an amount from zero up to about 5 atomic percent, ruthenium in an amount from zero up to about 5 atomic percent, balance other elements and impurities, wherein the interlayer has a coefficient of thermal expansion intermediate between that of the substrate and that of the protective layer.

15. The protected article of claim 14, wherein the interlayer comprises from about 51 to about 61 atomic parts chromium, from about 18 to about 26 atomic parts palladium, and from about 18 to about 26 atomic parts nickel.

16. The protected article of claim 14, wherein the interlayer comprises about 56 atomic parts chromium, about 22 atomic parts nickel, and about 22 atomic parts palladium.

* * * * *